United States Patent [19]

Gurtner et al.

[11] Patent Number: 4,486,402
[45] Date of Patent: Dec. 4, 1984

[54] PROCESS FOR THE PREPARATION OF HIGH PURITY ALUMINAS STARTING FROM IMPURE ALUMINUM CHLORIDE SOLUTIONS

[75] Inventors: Bernard Gurtner, Grenoble; Robert Barral, Saint Symphorien D'Ozon; Roland Bachelard, Lyon, all of France

[73] Assignee: Produits Chimiques Ugine Kuhlmann, Courbevoie, France

[21] Appl. No.: 449,867

[22] Filed: Dec. 15, 1982

[30] Foreign Application Priority Data

Dec. 30, 1981 [FR] France ............... 81 24486

[51] Int. Cl.³ ........................... B01D 9/02
[52] U.S. Cl. ........................... 423/626; 23/305 A
[58] Field of Search ............. 23/305 A, 300; 423/626

[56] References Cited

U.S. PATENT DOCUMENTS

| | | | |
|---|---|---|---|
| 3,406,010 | 10/1968 | Holderreed et al. | 23/305 A |
| 4,056,363 | 11/1977 | Messner | 23/305 A |
| 4,264,332 | 4/1981 | Ziegenbaig et al. | 23/305 A |

Primary Examiner—Hiram H. Bernstein
Attorney, Agent, or Firm—Oblon, Fisher, Spivak, McClelland & Maier

[57] ABSTRACT

Process for the preparation of high purity alumina containing less than 0.1 weight percent of residual chlorine starting from impure aluminum chloride solutions, which process comprises a crystallization step to provide aluminum chloride hexahydrate crystals having a diameter of from about 400 to about 4000 micrometers in the presence of hydrochloric acid; washing the aluminum chloride hexahydrate crystals so obtained with pure hydrochloric acid; and pyrohydrolyzing the washed crystals of aluminum chloride hexahydrate at a temperature of from about 700° to about 1300° C., in which pyrohydrolysis a gas is forced through a layer of the washed aluminum chloride hexahydrate so as to remove the gaseous reaction products while obviating any possible movement of the solid by the gas, the process particularly producing transition aluminas simultaneously having a specific surface area greater than 100 m²/g and a chlorine content less than 0.1 weight percent.

15 Claims, 3 Drawing Figures

PROCESS FOR THE PREPARATION OF HIGH PURITY ALUMINAS STARTING FROM IMPURE ALUMINUM CHLORIDE SOLUTIONS

BACKGROUND OF THE INVENTION

The present invention relates to novel processes for the preparation of high purity aluminas, and more particularly, it relates to novel processes for the preparation of high purity aluminas from impure solutions of aluminum chloride.

The high purity aluminas which are aimed at have purities above 99.9% $Al_2O_3$. Their uses today are quite numerous. For example, such high purity aluminas are used in the area of ceramic processes, the preparation of translucent aluminas, in luminescent compositions for fluorescent lights, in bioceramics, and for metal polishing. In addition, they comprise a primary material for the preparation of single crystals according to the Verneuil crystallization technique.

Different processes can be used to obtain aluminas of high purity. Certain among these utilize aluminum as the starting material. In such cases, this is converted to the salt of an organic acid or to an alcoholate which is then hydrolyzed or thermally decomposed to obtain finally the alumina. Despite the possibility of recycling the alcohol in certain cases, the cost of this alumina is very high because of the necessity to employ metallic aluminum.

Some of the other routes start from impure aluminum hydroxide products, large quantities of which are obtained in the aluminum industry starting from minerals. These consist of passing through an intermediate mineral salt the crystallization of which permits the elimination of the major portion of the impurities. The product thus obtained also is thereafter thermally decomposed to form pure alumina. Some other procedures according to this principle are based on the crystallization of ammonium alum which is formed starting from aluminum hydroxide, sulfuric acid, and ammonia, but this method of operation with such salt presents numerous disadvantages.

In the first place, it leads to a very high consumption of reactants since the molecule $NH_4Al(SO_4)_2.12H_2O$ does not contain more than 11% alumina and the gaseous decomposition products are not recoverable. Moreover, ammonium alum presents the peculiarity of melting at about 90° in its own water of crystallization. This results in certain technological difficulties in economically carrying out the thermal treatment of this product, although a distinctly better performing process is the subject of French Patent Application No. 80/14620.

By comparison, it seems more attractive to go by the aluminum chloride route. In effect, by starting from aluminum chloride solutions, it is possible to crystallize the hexahydrate, $AlCl_3.6H_2O$, in which the amount of alumina is raised to about 21% and which does not melt in its own water of crystallization. Moreover, the pyrohydrolysis of this salt liberates a mixture of hydrochloric acid and water which can eventually be recovered.

The sources of aluminum chloride are, moreover, rather numerous. Certain of these solutions are obtained by attacking aluminum with hydrochloric acid such as is practiced in the processes called etching. These liquids are of good purity, although occasionally relatively dilute. The dissolution of certain minerals, such as clays, equally permits the preparation of impure chloride solutions, the purification of which has been studied. Finally, as for alum, it is easy to dissolve the trihydrate of alumina in hydrochloric acid solutions to obtain an aluminum chloride solution. The ways of changing solutions of aluminum chloride to alumina are numerous.

Certain of the methods for converting aluminum chloride to alumina involve a direct pyrohydrolysis of the solution in a flame. The reaction is extremely fast but the dechlorohydration is rarely complete. Also, the alumina recovered always contains relatively large quantities of residual chlorine. To reduce the chlorine content, one can only increase the flame temperature which, concomitantly, enlarges the crystals and this inevitably leads to powders having a small specific surface area. Moreover, the brevity of treatment, although helpful to equipment productivity, is bad for the homogeneity of the product.

The other category of processses includes those which call for the crystallized aluminum chloride hexahydrate to pass through an intermediate stage. This step in principle permits the separation of impurities and especially iron, but the chloride remains dissolved in the mother liquor. After washing with a pure acid solution, the crystals are thermally treated. There follows a hydrolysis by the water of crystallization which results in partial dechlorohydration of the product. The complete pyrohydrolysis requires finally bringing the product to a sufficiently high temperature.

It is still observed that it has not been possible up to the present to prepare transition aluminas with a high specific surface and not containing more than about 0.1% residual chlorine on an industrial scale by such methods. Now, for certain uses of high purity aluminas, it is necessary to provide products having specific areas greater than 100 $m^2/g$. This is the case for polishing agents, for the Verneuil crystallization, for use as loading, especially in electrical capacitor papers, and for other uses.

Moreover, for ceramic procedures involving corundum fritting, one always seeks to obtain powders of the highest possible homogeneity in particle size. To obtain such uniformity, it is preferable to prepare a homogeneous product at an intermediate stage, crystallized in fine elementary particles by which the transformation to corundum can be assured by a well defined calcination schedule.

There accordingly exists a need to have a commercial process for the production of high purity aluminas starting from aluminum chloride solutions offering the means for obtaining intermediate aluminas characterized by a high specific surface area and a residual chlorine content of not more than 0.1%.

THE INVENTION

The present invention responds to the foregoing need and provides a process for the preparation of high purity aluminas starting from impure solutions of aluminum chloride. The present processes comprise crystallization in one or in two stages of aluminum chloride hexahydrate in crystals having an equivalent diameter of from about 400 to about 4,000 micrometers, followed by a continuous or batch calcination in a down-flow bed leading to a product always containing less than 0.1% residual chlorine even when the specific surface area is greater than 100 $m^2/g$ and permitting the total re-use of hydrochloric acid by virtue of its recovery in a concentrated form.

The present invention is further illustrated by reference to the drawings, wherein FIG. 1 is a schematic of apparatus involving a liquid-solid fluidized bed;

Figure 2:
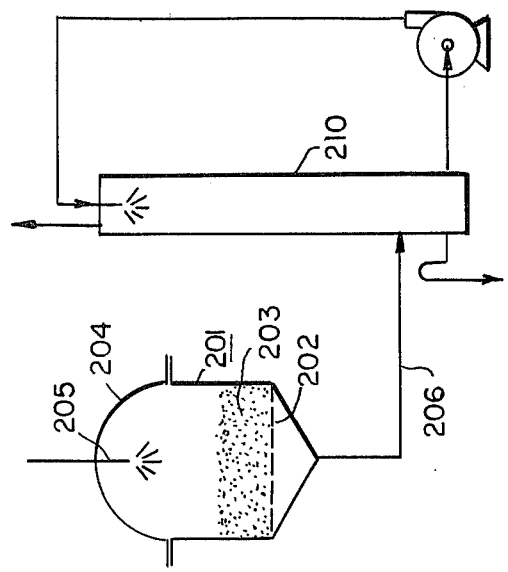
FIG. 2 is a schematic of a down-flow batch apparatus.

To carry out the crystallization according to the present invention, the starting solutions are concentrated to contain between about 8 and about 33% by weight of aluminum chloride, and in certain preferred embodiments, the solutions contain from about 25 to about 32 weight percent of aluminum chloride. The continuous crystallization of the hydrate is obtained by continuously introducing gaseous hydrochloric acid and the starting solution of aluminum chloride into an agitated suspension of aluminum chloride hexahydrate crystals in a more or less depleted solution containing from about 0.5 to about 15% of aluminum chloride, and preferably from about 0.5 to about 4% aluminum chloride.

In order to obtain the large crystals sought and to ensure satisfactory depletion of the solution, the concentration should be maintained at a hydrogen chloride level in the solution of from about 15 to about 35%, and in preferred embodiments the amount of hydrogen chloride in the solution is maintained at from about 29 to about 34%. The solubility of aluminum chloride varies slightly as a function of the temperature, so it is possible to operate at temperatures of from ambient up to about 80° C. It is, however, particularly advantageous to operate between 50° and 75° C., as inside this range there is particularly a beneficial diminution in nucleation frequency. Another advantage of working between 50° and 75° C. in this preferred range is that the concentration of hydrogen chloride is automatically controlled by the saturation of the solution.

One preferred way of carrying out the crystallization comprises operating in a liquid-solid fluidized bed which permits the continuous recovery of crystals having appreciable size with a high productivity and a satisfactory depletion of the solution. One such apparatus is shown by the FIG. 1 diagram.

Crystallizer 10 is a cylinder having a conical base and fitted in its upper portion with a flare to reduce the upward speed of the liquid. The suspension of crystals 11 is kept in continual motion by the action of agitator 12. At the upper part, the mother liquor leaving through conduit 14, containing only some fine particles, passes through heat exchanger 20. From heat exchanger 20 the mother liquor is recycled by means of circulation pump 30 through line 31 to crystallizer 10. Part of the mother liquor is removed through line 15 and comprises purge material obtained at 16.

The removal of large sized crystals is effected in the conical portion 17 of crystallizer 10, and the slurry of these crystals is removed from crystallizer 10 through line 18 to filter 40.

The reactor feed is carried out at several points 19 and 19' at the lower portion of the cylindrical part of the reactor for the aluminum chloride. The hydrochloric acid is introduced at the base of the cone via line 32 into the recycling circuit 31 for the mother liquor.

Obtaining such large crystals is one means for improving the purity of the chloride. In effect, it is easily demonstrated after the results obtained starting from an impure solution prepared by dissolution of Bayer aluminum hydroxide and crystallized into crystals of different sizes. The quantities of remaining impurities in the $Al_2O_3$ are given as follows:

| Impurities in ppm based on $Al_2O_3$ | Starting $Al(OH)_3$ | Aluminum chloride hexahydrate | | |
|---|---|---|---|---|
| | | 50 μm diameter | 1–2 mm diameter | 2–3 mm diameter |
| Ca | 250 | 40 | 21 | 15 |
| Fe | 200 | 15 | 5.4 | 3.2 |
| Ga | 88 | 3.3 | <2 | <2 |
| Mg | 3.5 | 2.7 | 2.1 | ≦2 |
| Mn | 1.9 | <0.5 | <0.5 | <0.5 |
| Na | 1,700 | 90 | 44 | ≦40 |
| Si | 65 | 20–30 | 13 | 11 |
| Ti | 12 | <3 | <3 | <3 |

After separation by filtration and draining or dewatering, the crystals are washed by pure acid recycled from the calcination in the down-flow bed. This calcination in a down-flow bed is characterized by the fact that hot gases are forced through the layer of aluminum chloride hexahydrate crystals in such a manner that the passage of the said gas through the bed does not cause movement of the solid with the gas although the speed of gas flow is greater than the minimum speed for fluidization of the crystals. The gas is forced to traverse the crystallized aluminum chloride bed by pressure or by aspiration.

It will be understood that various methods of carrying this out can be used. The hydrated chloride can be placed on a porous support and the gas can be forced to pass through the bed from top to bottom. The hydrated chloride can be placed in a sandwich between two porous supports and the gas can be forced to traverse laterally or else from bottom to top.

It will be understood from the present description that the process can be carried out in a batch method in which case the chloride layer is immobile, or completely in a continuous fashion, the chloride bed then being set into motion by flowing at a controlled speed along the length of the walls of the reactor. According to one preferred method of the invention, the heat necessary for pyrohydrolysis of the chloride is carried by the said gas. The gas forced through the bed of hydrated aluminum chloride can be comprised of humid air or gases from the combustion of hydrocarbon, but it will be understood from the present description that other gases can also be used.

The temperature of the pyrohydrolysis is generally from about 700° to about 1300° C. In the preparation of transition aluminas, it is preferable that the temperature be from about 700° to about 900° C.

Figure 3:
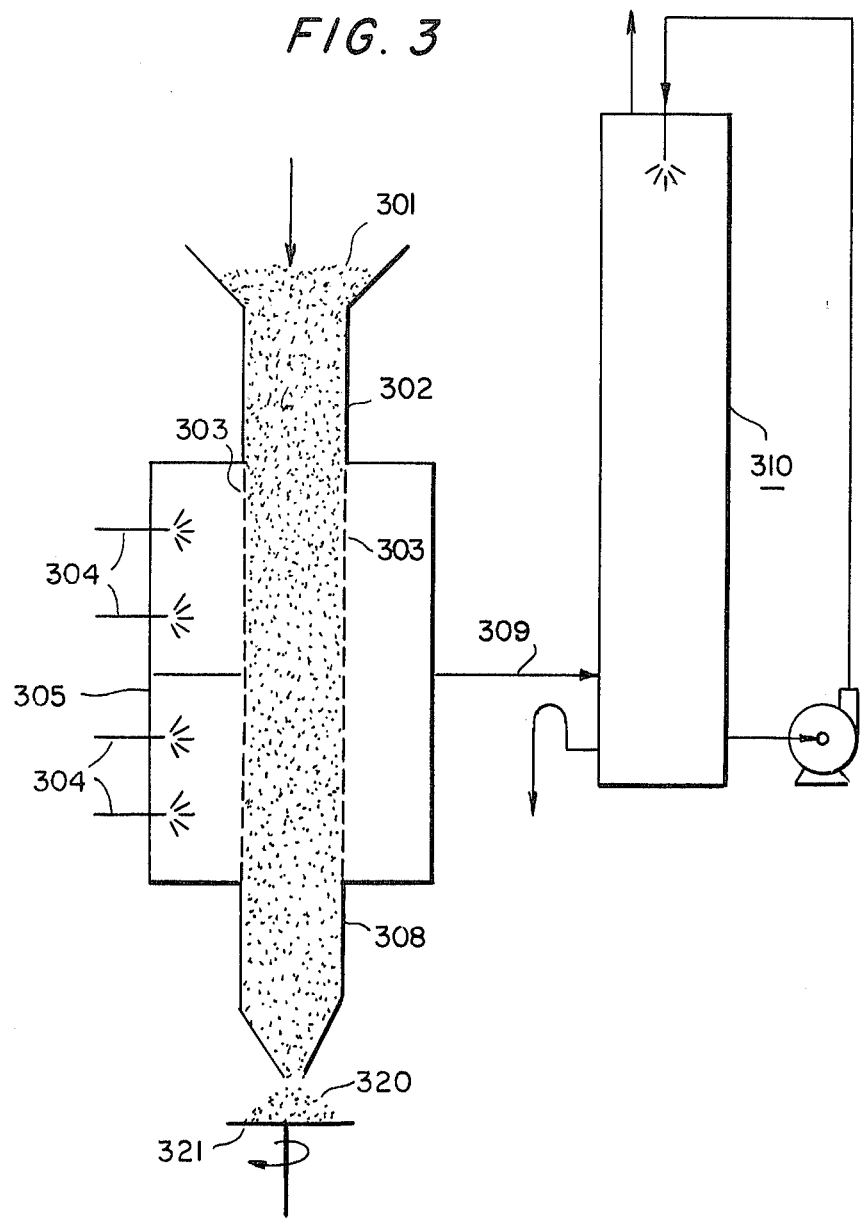
FIG. 3 is a schematic representation of an apparatus utilizing a continuous down-flow bed.

As noted above, the procedures to be illustrated with respect to FIGS. 2 and 3 respectively show discontinuous and continuous calcination in a down-flow bed.

Referring to FIG. 2, the batch reactor is a cylindrical chamber or a parallelepiped 201 having its interior lined with a refractory resistant to corrosion by hydrochloric acid. The base of the reactor is comprised of a porous plate 202 on which the layer 203 of crystals to be treated rests. A mantle 204 supporting burner 205 securely closes the upper portion of reactor 201. The combustion gases from the burner pass through the reactive layer 203 at a high speed to entrain the hydrochloric acid liberated. The liberated gases are conducted by conduit 206 to absorption column 210, which column provides for the recovery of the hydrochloric acid. To end the operation, the burner is shut off but air continues to pass through the charge to facilitate cooling. When the charge is sufficiently cooled, mantle 204 is removed and the alumina is aspirated into aluminum containers. Thereafter, a new charge of reactants can be put into place.

The continuous process can be carried out in apparatus of the type illustrated in FIG. 3. This apparatus comprises in its upper central part a feed conduit 302 for crystals 301 of the aluminum chloride hexahydrate. These crystals thereafter move into the pyrohydrolysis zone by sliding slowly between porous parallel walls 303. The cross-section of the reactor is generally rectangular in shape.

Through one of the porous faces 303 hot gases are passed transversely. These gases can, for example, be obtained from a series of gas burners 304 placed in closed housing 305. It is possible to define different heating zones and to maintain these in series corresponding to the different temperature levels. The hot gas passes through the layer of aluminum chloride particles at high speed and leaves through the other of porous faces 303 so as to entrain water and the resulting hydrogen chloride in a second tight chamber 306.

Conduit 309 is used to carry the gases to absorption system 310, where the hydrochloric acid is recovered. At the lower extremity of porous faces 303, the product entirely changed to alumina passes through cooling zone 308 and leaves the reactor in the form of small granules 320. These are continuously removed through use of a powder distributor 321.

In utilizing a down-flow bed according to the process of the present invention, superior heat and mass exchange are obtained. This in turn results in a much higher productivity for such installations.

The process of the present invention can be appreciated to have numerous advantages. Not only do the processes according to the present invention lead to higher productivity, but also they permit obtaining on a commercial scale high purity transition aluminas with a residual chlorine content less than 0.1% and with a specific area which exceeds 100 m²/g. Another very important advantage of the present invention resides in the fact that the transition aluminas prepared according to the present processes are very reactive with respect to their transformation into corundum. Also, when a prior art gamma-alumina obtained from alum is calcined at 1150° C. for two hours, which material has a specific area of 100 m²/g, there is obtained a powder the specific surface of which is 49 m²/g and with the quantity of corundum not being greater than 52%. Under the same conditions, a gamma-alumina obtained from chloride according to the present invention provides 95% pure α-alumina for a specific surface reduced to 6 m²/g.

A further secondary advantage of the presently claimed process lies in the complete recycling of the pure hydrochloric acid product from the calcination. It can thus be used in the previous steps for dissolution and crystallization.

All parts, percentages, proportions, and ratios herein are by weight, unless otherwise indicated.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Preparation of Aluminum Chloride Solution

An alumina trihydrate obtained according to the Bayer process contains the principal impurities as shown in the following table, expressed with respect to the $Al_2O_3$.

| Starting Al(OH)₃ | Ca | Fe | Ga | Mg | Mn | Na | Si | Ti |
|---|---|---|---|---|---|---|---|---|
| Impurities, ppm | 250 | 200 | 88 | 3.5 | 1.9 | 1700 | 65 | 12 |

This product is introduced into an ebonite reactor, externally heated by the circulation of steam through tubes. The hydrate is mixed with excess hydrochloric acid with a concentration of about 30%. The suspension is maintained under agitation and is progressively brought to a temperature of 72° C. At that point, the heating is stopped and the temperature rises to 110° C. before dropping to 90° C. over three hours and 30 minutes. The liquor is then filtered to separate the insolubles and a clear solution containing about 30 weight percent of aluminum chloride is recovered, with the temperature being 60° C. The pH of the solution is 1.

EXAMPLE II

Comparative Example of the Crystallization of Aluminum Chloride Hexahydrate

In a Pyrex glass reactor with a capacity of one liter and a diameter of 10 cm, fitted with an anchor-type agitator, and with means for the introduction of hydrogen chloride gas and aluminum chloride solution and the means for removing crystal slurry at the bottom, 500 g of an aqueous hydrochloric acid solution containing about 40% hydrogen chloride is introduced. A feed rate of 40 g/hr of hydrogen chloride gas is continuously maintained throughout the entire crystallization. The solution being kept at ambient temperature, the quantity of hydrogen chloride stabilizes at 42%.

Then, a 30% aqueous solution of the same aluminum chloride utilized in the previous Example is introduced at the rate of 80 g/hr, the speed of the agitator being kept at 100 rpm. Some crystals form and the crystal suspension thickens. The contents at the bottom of the flask are removed regularly so as to maintain the level of liquid in the crystallizer constant as well as the viscosity of the suspension.

After having run 2500 g of the 30% aluminum chloride solution, the feed is stopped. The suspension of crystals is removed from the reactor and then filtered. The filter cake is washed with a 38% solution of hydrochloric acid and then drained. Needle-shaped crystals having a mean length on the order of 50 micrometers are recovered. A representative sample of the crystals is placed in a platinum crucible and calcined at 1000° C. for three hours. The recovered alumina is subjected to emission spectrography to determine the impurities. The following results are obtained:

| Impurities | Ca | Fe | Ga | Mg | Mn | Na | Si | Ti |
|---|---|---|---|---|---|---|---|---|
| Amount, ppm | 40 | 15 | 3.3 | 2.7 | <0.5 | 90 | 25 | <3 |

Despite the very sensible purification of the starting product, the purity level produced does not permit utilizing the product in the fabrication of translucent ceramics for high pressure sodium vapor lamps, for example.

EXAMPLE III

Crystallization of Aluminum Chloride Hexahydrate

Figure 1:
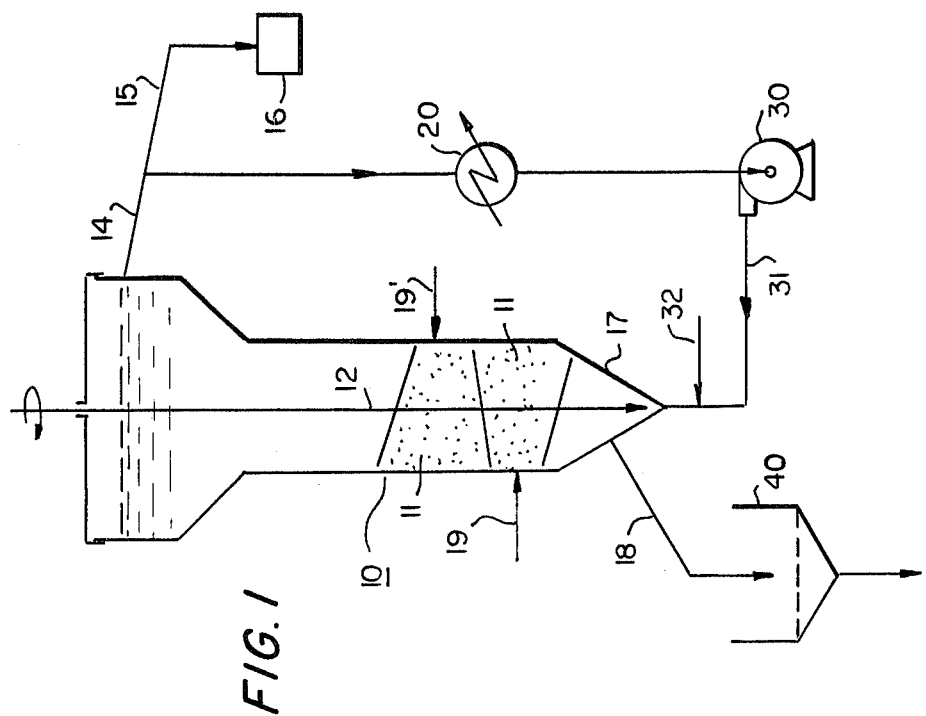

A cylindro-conical crystallizer according to FIG. 1 with a diameter of 0.08 m and a height of 0.5 m, fitted with an agitator turning at 20 rpm is charged with 15 L/hr of mother liquor of crystallization of $AlCl_3.6H_2O$, circulated by means of pump 30. The crystallizer is fed with a 30% aluminum chloride solution at the rate of 300 g/hr, divided equally between conduits 19 and 19'. Through conduit 32, there is introduced at the rate of 80 g/hr gaseous hydrochloric acid measured by means of a rotameter. The crystallizer initially contains a charge of crystals of very dispersed crystal size prepared in an earlier experiment. The temperature in the apparatus is kept at 60° C. by means of heat exchanger 20 which results in operation with the mother liquor of crystallization saturated with hydrogen chloride at that temperature. The composition of the mother liquor is 33% HCl and 1% $AlCl_3$.

Periodically or in a continuous manner, some crystals of $AlCl_3.6H_2O$ are withdrawn from the bottom of the reactor so as to maintain a constant quantity of crystals in the crystallizer. The excess mother liquor is removed in parallel from the recycle stream.

The crystals are withdrawn when their size is judged to be sufficient. Under these conditions of operation, the mean size is about 1.2 mm. Their particle size distribution is very compact and is comprised between 0.6 and 2 mm. At the exit from the crystallizer, the chloride crystals are filtered, washed with a 33% hydrochloric solution and an aliquot portion is then set apart and converted into alumina as in the preceding Example.

The spectrographic analysis provides the following results:

| Impurities | Ca | Fe | Ga | Mg | Mn | Na | Si | Ti |
|---|---|---|---|---|---|---|---|---|
| Amount, ppm | 20 | 5 | <2 | 2 | <0.5 | 45 | 13 | <3 |

The purity level attained by this crystallization permits the use of these aluminum chloride hexahydrate crystals as the starting material for the production of high purity alumina destined for specific applications of this class of particles.

EXAMPLE IV

Comparative Preparation of Alumina Starting From Aluminum Chloride Hexahydrate

Some crystals of $AlCl_3.6H_2O$ prepared according to the procedure of Example III are converted to alumina. To this end, a layer of the aluminum chloride powder with an average thickness of 2 cm is placed in containers in an electric resistance oven. The enclosure is fitted with a ventilation system to aspirate the ambient air. The furnace is on a permanent cycle, its temperature is about 800° C.

The containers of the hexahydrate at ambient temperature are quickly introduced into the furnace and maintained therein for three hours. The product recovered at the end of the calcination is analyzed by X-ray diffraction. It turns out to be a transition alumina, principally of the gamma variety. Its specific area is about 109 $m^2/g$. Unfortunately, it still contains 0.33% of chlorine, which is an excessive quantity.

EXAMPLE V

Comparative Example

In the same apparatus as in the preceding Example IV, an aluminum chloride hexahydrate is calcined for three hours at a temperature which is brought this time to 900° C. The length of the operation is maintained at three hours. The product recovered is then correctly dehydrochlorinated inasmuch as the residual chlorine content is not greater than 460 ppm, but its specific surface area has fallen to 80 $m^2/g$. It is a mixture of transition aluminas.

EXAMPLE VI

Calcination in Batch Down-Flow Bed

Some crystals of $AlCl_3.6H_2O$ prepared in a fluidized bed according to the procedure described in Example III are placed in the interior of a quartz reactor with a platinum screen supported by a piece of porous ceramic. The quartz tube is wrapped with a ceramic fiber cloth sufficiently thick that the temperature of the walls does not rise above 60° C. even when the product is heated to 1000° C. in the tube. The charge of chloride is 425 $g/dm^2$ of reactor cross-section.

The bed of chloride of uniform thickness thus comprised is swept from top to bottom with a hot humid air current containing 5.8% water by volume. The rate of air flow is 1.75 $Nm^3/hr.dm^2$ of cross-section. The air is preheated by passing it through a radiant chest equipped with electrical resistors such that the air penetrates into the crystal layer at a temperature of 800° C. At the end of one hour, the system is in equilibrium and the charge is at 800° C. The apparatus is maintained in that regime for two hours under those conditions.

During the entire duration of the operation, about three hours, a pressure drop is observed in the reactor. This remains relatively small and is always less than 10 mbar. The maximum is obtained at about 300° C.

At the end of the selected time, the gas feed is interrupted and the charge is permitted to cool. There is recovered in that way 87.2 g of alumina per $dm^2$ of reactor cross-section. The analysis reveals that the resulting eta-alumina does not contain more than 900 ppm of residual chlorine and provides a specific surface area raised to 133 $m^2/g$. This product of excellent purity is well-suited, optionally after de-agglomeration, for all the uses of high purity transition aluminas.

Moreover, it can be particularly rapidly converted to corundum. Thus, by heating at 1150° C. for two hours, a powder comprising 95% of alpha-alumina is recovered with a specific area not more than 6 $m^2/g$. This product can be used by fritting for the preparation of the finest technical ceramics.

EXAMPLE VII

Calcination in Continuous Down-Flow Bed

Aluminum chloride hexahydrate is placed in a continuous reactor for pyrohydrolysis. It is essentially comprised of two parallel vertical plates of porous ceramic separated by 5 cm. These grills are maintained in place laterally by walls of refractory cement fastened to acid aluminum phosphate. The volume defined by the two porous walls and the two flat lateral walls is filled with aluminum chloride hexahydrate crystals of large particle size obtained by crystallization in a fluidized bed. These crystals are placed into a slow gliding movement at a controlled speed and comprising together a fluidized bed.

The external faces of the porous walls are joined to narrow chambers and entirely lagged. Into these, hot humid air at the rate of 0.45 Nm$^3$/hr.dm$^2$ of porous wall surface is introduced. At the other side, one recovers the humid gas loaded with hydrochloric acid which is directed to an absorption tower.

The entering gas contains 5% water by volume. The reactor comprises a single stage, that is to say that the gas enters the porous walls upstream everywhere at the same temperature. This temperature is constant and in the selected example, it is some 800° C. Inside the product, a temperature gradient is established between the entrance and the exit because of the endothermic reaction. The total dwell time of the product in the reactor is about one hour. The mean speed of descent through the bed is about 1 cm per minute.

The temperature is 800° C. is obtained at the end of 20 minutes while the particles are carried about 20 cm. The product which continuously leaves is analyzed. It is shown to be an etaalumina with a residual chlorine content which does not surpass 150 ppm and which has a specific area reaching 140 m$^2$/g.

The exhaust gas has 48% hydrochloric acid with respect to the HCl-water mixture. The solution recovered is utilized for washing the chloride crystals, the generation of hydrogen chloride gas for the crystallization and for the attack on the hydrate.

What is claimed is:

1. A process for the preparation of high purity alumina containing less than 0.1 weight percent of residual chlorine, starting from impure aluminum chloride solutions, comprising
   (a) crystallization of aluminum chloride hexahydrate from the aluminum chloride solutions to provide crystals having a diameter of from about 400 to about 4000 micrometers in the presence of hydrochloric acid;
   (b) separation by filtration-drainage of the aluminum chloride hexahydrate crystals so formed and washing the crystals with pure hydrochloric acid;
   (c) pyrohydrolysis of the washed aluminum chloride hexahydrate crystals at a temperature of from about 700° to 1300° C., utilizing a gas passed through a layer thereof so as to remove the gaseous reaction products formed while hindering the possible movement of the solid along with the gas.

2. A process according to claim 1 wherein the crystallization of aluminum chloride hexahydrate is effected in a liquid-solid fluidized bed.

3. A process according to claim 1 wherein the impure aluminum chloride solution contains from about 8 to about 33 weight percent of aluminum chloride.

4. A process according to claim 1 wherein the crystallization of the aluminum chloride hexahydrate is carried out continuously with introduction of the initial impure aluminum chloride solution and gaseous hydrochloric acid into an agitated suspension of aluminum hexahydrate chloride crystals in a spent solution containing from about 0.5 to about 15 weight percent of aluminum chloride.

5. A process according to claim 1 wherein the concentration of the hydrochloric acid solution utilized in the crystallization step is from about 15 to about 35 weight percent.

6. A process according to claim 1 wherein the aluminum chloride hexahydrate crystallization is carried out at a temperature of from about 50° to about 75° C.

7. A process according to claim 1 wherein the step of pyrohydrolyzing the aluminum chloride hexahydrate crystals is carried out with the crystals being in a uniform layer on a porous support and wherein the gas passes through the layer from the top to the bottom, the gas circulating at a speed greater than the minimum fluidization speed of the charge.

8. A process according to claim 1 wherein the step of pyrohydrolyzing the aluminum chloride hexahydrate crystals is carried out in a sandwich between two porous supports and in which the gas traverses the sandwich laterally.

9. A process according to claim 1 wherein the step of pyrohydrolyzing the aluminum chloride hexahydrate crystals is carried out in a sandwich between two porous supports and in which the gas passes from the bottom to the top.

10. A process according to claim 1 wherein the pyrohydrolysis step is batch-wise and the layer of aluminum chloride hexahydrate crystals is immobile.

11. A process according to claim 1 wherein the pyrohydrolysis step is carried out continuously with the layer of aluminum chloride hexahydrate crystals being brought into a slow sliding movement at a controlled speed along the walls of the reactor.

12. A process according to claim 1 wherein the heat required for the pyrohydrolysis is carried by the gas which is forced to pass through the layer of aluminum chloride hexahydrate crystals.

13. A process according to claim 1 wherein the gas passing through the aluminum chloride hexahydrate layer is comprised of wet air or by combustion gases from the burning of a hydrocarbon.

14. A process according to claim 1 wherein the hydrochloric acid formed in the course of the pyrohydrolysis of the aluminum chloride hexahydrate is recovered in an absorption tower in the form of an aqueous solution which is recycled to the washing step for the crystals and/or to the crystallization step where it serves for the generation of gaseous hydrogen chloride and/or possibly for the preparation of the initial solution of aluminum chloride by attack on aluminum trihydroxide.

15. A transition alumina simultaneously having a specific area of from about 100 to about 150 m$^2$/g and a chlorine content less than 0.1 weight percent obtained by the process of claim 1.

* * * * *